United States Patent [19]

Szalai

[11] 4,073,358
[45] Feb. 14, 1978

[54] VEHICLE DRIVING GEAR SYSTEM

[75] Inventor: Gábor Szalai, Gyor, Hungary

[73] Assignee: Magyar Vagon- es Gepgyar, Gyor, Hungary

[21] Appl. No.: 740,346

[22] Filed: Nov. 8, 1976

[30] Foreign Application Priority Data

Nov. 3, 1975  Hungary ............................ GA 2727

[51] Int. Cl.$^2$ .................... B62M 11/16; B62M 11/18
[52] U.S. Cl. ....................................... 180/75; 74/710; 74/750 R; 180/88
[58] Field of Search ................... 180/70 R, 88, 24.09, 180/44 R, 75; 74/695, 710, 750 R, 789

[56] References Cited

U.S. PATENT DOCUMENTS

| | | | |
|---|---|---|---|
| 1,399,019 | 12/1921 | Krohn | 74/695 |
| 1,636,819 | 7/1927 | Huck | 74/695 |
| 1,636,820 | 7/1927 | Huck | 74/695 |
| 2,222,697 | 11/1940 | Armington | 74/695 |
| 2,403,594 | 7/1946 | Gilliard | 74/750 R X |
| 2,882,752 | 4/1959 | Russell | 74/695 |
| 3,195,371 | 7/1965 | Christie | 74/750 R |
| 3,800,626 | 4/1975 | Koivunen | 74/695 |

Primary Examiner—Kenneth H. Betts
Attorney, Agent, or Firm—Ernest F. Marmorek

[57] ABSTRACT

A driving gear system, suitable for use in connection with a vehicle having a three speed transmission, and for use in connection with a high-power vehicle having an adjustable track width, the vehicle including a differential gear system having first bearing means, features a bridge housing mounted on said vehicle, a first planetary gear system disposed in the bridge housing and including a first sun wheel, a plurality of first planet wheels, each having a first radius, and first supporting means operable for supporting the first planet wheels, a second planetary gear system disposed in the bridge housing and including a second sun wheel, a plurality of second planet wheels, each having a second radius, and second supporting means operable for supporting the second planet wheels and mounted for coaxial rotation with respect to the second sun wheel, the second radii being smaller than the first radii, the first bearing means being disposed in the first supporting means, housing shells connected to the bridge housing, connecting means operable for connecting the housing shells to a central portion of the bridge housing and for connecting the first supporting means to the bridge housing, the first sun wheel being mounted on a portion of the second supporting means for rotation therewith, and a second bearing means disposed between the first and second supporting means and operable to allow the rotation of the second supporting means relative to the first supporting means.

4 Claims, 3 Drawing Figures

VEHICLE DRIVING GEAR SYSTEM

BACKGROUND OF THE INVENTION

The invention relates to a driving gear system, suitable for use in connection with a vehicle having a three-speed transmission, and for use in connection with a high-power vehicle having an adjustable track width.

Generally, it is desirable for the driving gear system to have the lowest possible net weight and load on the shaft and still provide the desired momentum safely throughout the projected working life.

These requirements are of particular importance in the case of large heavy vehicles wherein engine performance with good efficiency such as in the case of a vehicle providing high tractional forces, is important and difficult to achieve. Such vehicles usually have two-speed transmissions in order to obtain the momentum levels. It is well known that the use of a three-speed transmission is advantageous from both a structural and technological point of view. The extremely high production costs for a driving gear system for use with a three-speed transmission can be reduced if elements which are usually suited for low power drives can be used and these elements can be produced economically in large quantities.

From the prior art, it is known that a driving gear system for a three-speed transmission can take the form of two final momentum increasing stages which are arranged in the form of a cone-wheel and crown-wheel transmission using series connected, two planetary gears. It is known that for this arrangement, the driving gear system must be built from elements which, beginning from the main gear in the driving direction, must withstand increasing magnitudes in forces. This means that the elements increase in strength and therefore cost in the driving direction, away from the main gear.

In the aforementioned vehicles, this does not present an insoluble problem because in arranging the planetary gears, the following possibilities are available:

I. Both planetary gear systems can be arranged in the wheel hub which usually has extra space and can accommodate these gears;

II. the planetary gear systems can be built into the bridge housing near the main drive; and III. one planetary gear system can be located near the main drive and the other planetary gear system of the last stage can extend into the wheel hub.

The selection of the arrangement depends upon the requirements imposed on the driving gear system.

Special vehicles such as prime movers or tractors include the capability of an adjustable track width. For such vehicles, it is preferable to have the planetary gear systems disposed in the bridge housing near the main drive. All other arrangements are considered to be generally impractical.

Carrying out the solution presents problems because the space is limited in the bridge housing in order to accommodate the "narrow track" demand made by the suspension cushions which come close to one another in the longitudinal direction of the bridge housing. In addition, there is also the problem that the diameter of the planetary gear system cannot be increased arbitrarily because a vertical clearance is needed between the ground and the bridge housing.

In the case of a vehicle with a three-speed transmission, the prior art uses a series connected, two planetary gear with the disadvantage of the external planetary gear having large dimensions. This results in the bridge housing taking on relatively large dimensions.

As a result, the connection of the driving gear system to the chassis of the vehicle becomes extremely complicated and often results in the incorporation of considerably extra weight.

The problem of extra weight is sufficiently serious to result in the prior art use of two-speed transmission for heavy vehicles having an adjustable track width, even though a three-speed transmission would be more desirable. Usually, the problem with these vehicles is essentially the difficulty in installing a planetary gear having the required diameter. Known examples of these prior art vehicles include vehicles manufactured by Massey-Ferguson and John Deere.

It is the goal of the instant invention to eliminate the aforesaid disadvantages and thereby provide a driving gear system suitable for vehicles having a three speed transmission and vehicles having an adjustable track width in such a way that the dimensions of the bridge housing need not be disadvantageously changed. In addition, the instant invention endeavors to assure that the bridge housing has basically three conformations of the driving gear suspension cushions, so that the most favorable low net weight is obtained from both a structural and technological point of view for high-power driving gears.

SUMMARY OF THE INVENTION

One of the principle objects of the invention is a driving gear system, suitable for use in connection with a vehicle having a three-speed transmission, and for use in connection with a high-power vehicle having an adjustable track width, the vehicle including a differential gear system having first bearing means, the driving gear system including a bridge housing mounted on the vehicle, a first planetary gear system disposed in the bridge housing and including a first sun wheel, a plurality of first planet wheels, each having a first radius, and first supporting means operable for supporting the planet wheels, a second planetary gear system disposed in the bridge housing and including a second sun wheel, a plurality of second planet wheels, each having a second radius, and second supporting means operable for supporting the second planet wheels and mounted for coaxial rotation with respect to said second sun wheel, the second radii being smaller than the first radii, the first bearing means being disposed in the first supporting means, housing shells connected to the bridge housing, connecting means operable for connecting the housing shells to the central portion of the bridge housing and connecting the first supporting means to the bridge housing, the first sun wheel being mounted on a portion of the second supporting means for rotation therewith and second bearing means disposed between the first and second supporting means and operable to allow the rotation of the second supporting means relative to the first supporting means.

Generally, the instant invention includes a double tandem power branched planetary system in a bridge housing in which, broadly speaking, the sun wheel of one planetary gear system is connected for rotation with the half-shaft branching from the differential gear system in which a toothed rim is directly connected with the driving half-shaft and the sun wheel of another planetary gear system adjoins the supporting means and, with the aid of toothed wheels rotating on stationary pins, drives an inner toothed rim which is connected with the driving half-shaft by means of the external toothed rim.

It is also desirable to construct the driving gear so that it displays flanged driving half-shafts directly adjacent to the external toothed rims, and that the connection flange is made in one piece with the driving half-shaft.

Furthermore, it is advantageous to construct the driving gear in such a manner so that loosely built-in external toothed rims which are self-adjustable to a limited extent and also self-adjustable loosely built-in inner toothed rim which directly adjoin the external toothed rims.

It is believed that these technical solutions not only reduce the external dimensions of the driving gear system, but in addition, made possible the assembling of vehicles having adjustable track widths through the use of a few multi-purpose components which can be economically produced and also provide an overall reduction in weight; that is, the novel structure appears to achieve contradictory goals.

The relatively small space of the instant driving gear system reduces the quantity of required oil and thereby reduces the operating costs.

A further advantage is that one planetary gear system is of a lower order of magnitude than the dimensions of the other planetary gear system, so that the suspension-cushions can be connected in the same plane as the outer planetary gear system.

The other planetary gear system which is a relatively "inner" position can be connected to a central portion of the bridge housing and thereby take up load forces on the conical roller bearings of the differential gear system.

The driving half-shaft possesses an advantageous shape by providing an appropriate mounting of the necessary rigidity through the combination of the function of several components, so that the half-shaft is provided with a connecting flange for the purpose of assuring the direct connection with the external rim.

The elimination of the detrimental effect of the forces acting on the planetary gear system is accomplished through the loose installation or limited self-adjustable coupling of the inner and external toothed rims with respect to one another as well as the connection of the driving half-shaft. Nevertheless, these interconnections are reliable and advantageous from the viewpoint of the transmission of power through the system.

A buffer disc is connected to the frontal surface of the driving half-shaft in order to limit the axial displacement of the driving half-shaft and reduce problems concerning the supporting means in the planetary gear systems.

Further objects and advantages of the invention will be set forth in the following specification and in part will be obvious therefrom without being specifically referred to, the same being realized and attained as pointed out in the claims hereof.

The invention accordingly comprises features of construction, combination of elements, and arrangement of parts which will be exemplified in a construction hereinafter set forth and the scope of the application of which will be indicated in the claims.

BRIEF DESCRIPTION OF THE DRAWINGS.

For a fuller understanding of the nature and objects of the invention, reference should be had to the following detailed description, taken in connection with the accompanying drawings, in which.

DESCRIPTION OF THE PREFERRED EMBODIMENTS

Figure 1:
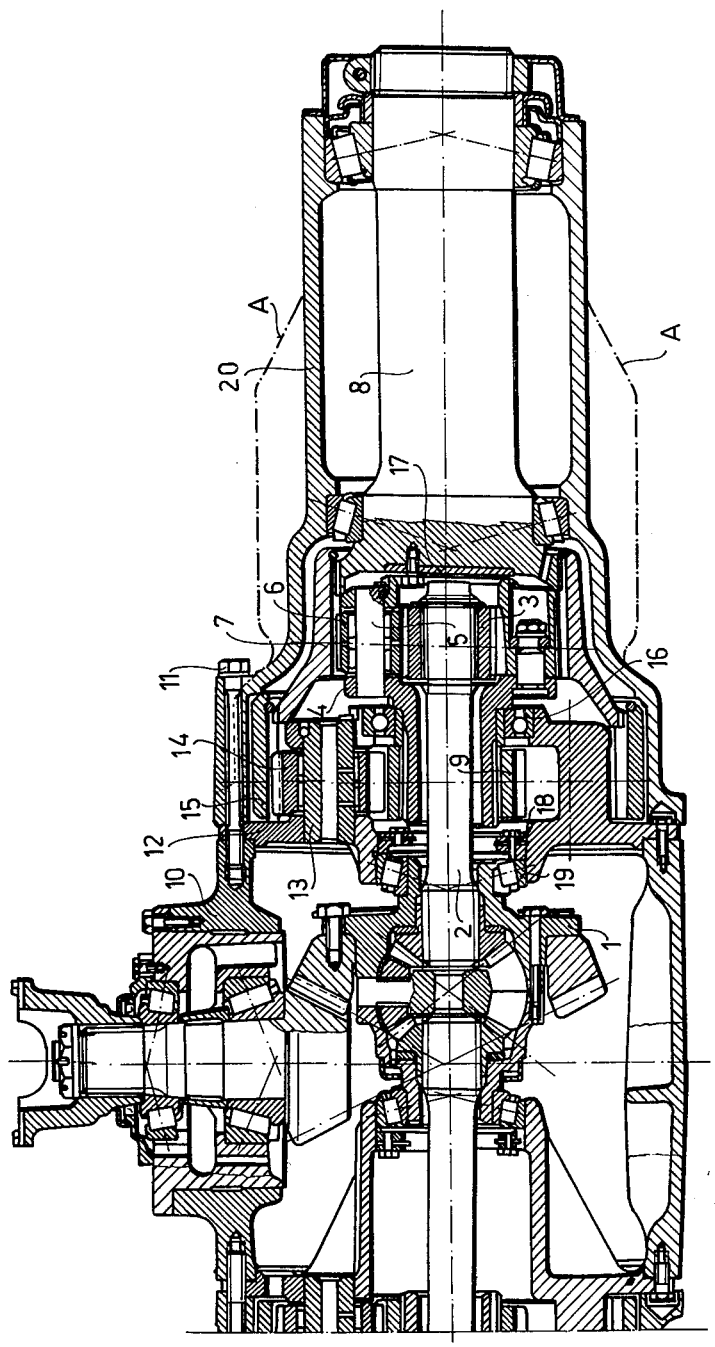
FIG. 1 is a cross-sectional view of a portion of a driving gear system according to the instant invention.
Figure 2:
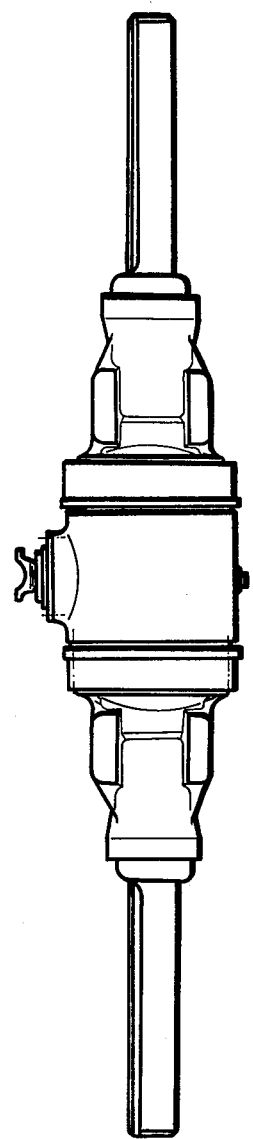
FIG. 2 is a front elevational view of a portion of a driving gear system having an adjustable track-width according to the instant invention.
Figure 3:
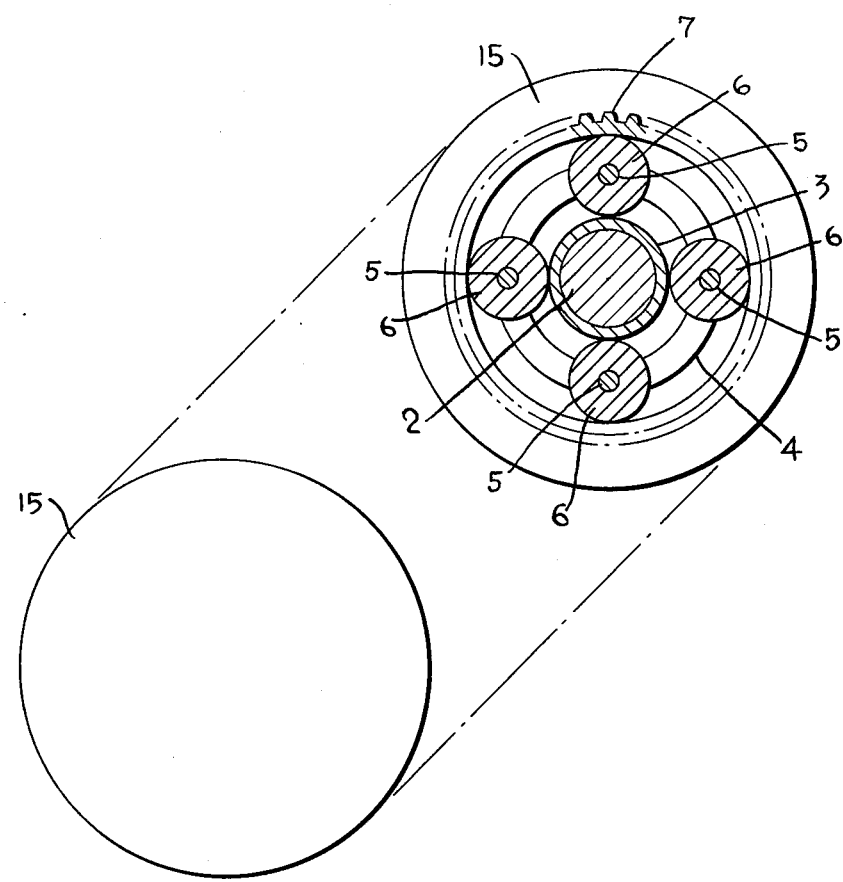
FIG. 3 shows a sectional view of each of the planetary gear systems.

In carrying the invention into effect, certain embodiments have been selected for illustration in the accompanying drawings and the description in the specification, reference being had to FIGS. 1 and 2.

It is well known in the art of the instant invention that the driving system for a vehicle is generally symmetrical so that an explanation of half of the system for a system is sufficient to describe the entire driving gear system. Furthermore, it is a practice to refer to a "half-shaft" with regard to the so-called half of the driving gear system. In this connection, it is pointed out that the instant invention has a possibility of being used as a two-fold system as indicated in FIGS. 1 and 2 or a driving gear system corresponding to substantially half of that which is shown in FIGS. 1 and 2.

Because of the symmetry of the systems shown in FIGS. 1 and 2, it is common practice to refer to a shaft on one side as being a "half-shaft". This prior art practice will be followed in the specification herein.

The differential gear system 1 is coupled to the half-shaft 2 which drives the sun wheel 3 of a planetary gear system. The sun wheel 3 drives the externally toothed rim 7 by means of the planetary wheels 6 which are connected to the pins 5 mounted on the supporting means such as planetary carrier 4.

The gear tooth system defined on the flange of the driving half-shaft 8 is connected in a loose self-adjustable manner to the toothed rim 7. A sun wheel 9 of another planetary gear system is connected to a projecting element of the planetary carrier 4 and drives the inner toothed rim 15 by means of planetary wheels 14. The planetary wheels 14 rotate on planetary pins 13. The planetary pins 13 are mounted on another supporting means such as planetary carrier 12 which, in turn, is connected by means of screws 11 to the middle portion 10 of the bridge housing. The toothed rim 15 is connected to the gear tooth system formed on the flange of the toothed rim 7.

A guide bearing 16 is mounted on a central bore hole of the planetary carrier 12 and guides the planetary carrier 4. Through a central bore hole in the planetary carrier 4, the driving half-shaft 2 is provided with a slot. The axial displacement of the planetary carrier 4 and the half-shaft 2 is limited by a buffer disc 17 mounted on the frontal surface of the driving half-shaft 8.

Clamping rings 18 including a threaded portion and bearings 19 are disposed in a central bore hole of the projected portion of the planetary carrier 12 and cooperate for the mounting of the differential gear system 1 as well as for the adjustment of the bearing capacity of the gear toothed system of the bevel wheel and crown wheel of the differential gear system 1, in accordance with the prior art practice.

The screws 11 tightly retain the planetary carrier 12 and also fasten the bridge housing shells 20 to the middle portion 10. The housing shells include suspension cushions forming an integral part thereof. Due to the surprisingly small dimensions of the planetary gear system, including sun wheel 9, it is possible to form suspension cushions along a relatively long section above this planetary gear system in the vicinity of the housing shells 20 which is designated by A in FIG. 1.

OPERATION

The parallel connected planetary gear systems as disclosed herein operate in the following manner.

The drive power of the half-shaft 2 is transferred to the sun wheel 3 and the drive power of the sun wheel 3 can be further transmitted to the rim 7 through two paths. One path includes the planetary wheels 6 and the other path includes the planetary carrier 4, the sun wheel 9, and the planetary wheels 14 which couple to the toothed rim 15 and eventually to the rim 7.

Thus, the two paths eventually come together at the rim 7, which is coupled to the half-shaft 8.

From FIG. 1, it can be seen that the instant invention is suitable for a vehicle having three speed transmission or a vehicle having an adjustable track-width because of the power-branched planetary gear systems. The planetary gears have no adverse effect on the dimensions of the middle portion of the bridge housing, so that the suspension-cushions can be added freely. Furthermore, the form of construction of the instant invention is uniform and the components fulfill multiple tasks so that fewer gear systems, screw connections and accurate fittings are needed as compared to prior art systems. These advantages also reduce the weight and production costs for the instant invention.

I wish it to be understood that I do not desire to be limited to the exact details of construction shown and described, for obvious modifications will occur to a person skilled in the art.

Having described the invention, what I claim as new and desire to be secured by Letters Patent, is as follows:

1. A driving gear system, suitable for use in connection with a vehicle having a three speed transmission and for use in connection with a high-power vehicle having an adjustable track width;
said vehicle including a differential gear system having first bearing means;
said driving gear system comprising, in combination:
a bridge housing mounted on said vehicle;
a first planetary gear system disposed in said bridge housing and including:
a first sun wheel; a plurality of first planet wheels, each having a first radius; and first supporting means operable for supporting said first planet wheels;
a second planetary gear system disposed in said bridge housing and including:
a second sun wheel; a plurality of second planet wheels, each having a second radius; and second supporting means operable for supporting said second planet wheels and mounted for coaxial rotation with respect to said second sun wheel;
said second radii being smaller than said first radii;
said first bearing means being disposed in said first supporting means;
housing shells connected to said bridge housing;
connecting means operable for connecting said housing shells to a central portion of said bridge housing and for connecting said first supporting means to said bridge housing;
said first sun wheel being mounted on a portion of said second supporting means for rotation therewith; and
second bearing means disposed between said first and second supporting means and operable to allow the rotation of said second supporting means relative to said first supporting means.

2. The driving gear system as claimed in claim 1, further comprising a first toothed rim in driving engagement with said first planet wheels.

3. The driving gear system as claimed in claim 2, further comprising a second toothed rim in driving engagement with said second planet wheels and said first rim, whereby power transmitted by said differential gear system can be transmitted to said first rim by said first and second planetary gear systems.

4. The driving gear system as claimed in claim 3, wherein said first and second rims include teeth which loosely engage each other, whereby the engagement is to a limited extent substantially self-adjustable.

* * * * *